(12) United States Patent
Mansell

(10) Patent No.: US 10,686,303 B2
(45) Date of Patent: Jun. 16, 2020

(54) DRAIN NIPPLE

(71) Applicant: Denny Mansell, Katy, TX (US)

(72) Inventor: Denny Mansell, Katy, TX (US)

( * ) Notice: Subject to any disclaimer, the term of this patent is extended or adjusted under 35 U.S.C. 154(b) by 0 days.

(21) Appl. No.: 15/292,318

(22) Filed: Oct. 13, 2016

(65) Prior Publication Data

US 2018/0109089 A1    Apr. 19, 2018

Related U.S. Application Data

(63) Continuation-in-part of application No. 13/656,547, filed on Oct. 19, 2012, now Pat. No. 9,722,403.

(51) Int. Cl.
*H02G 3/04* (2006.01)
*F16L 55/07* (2006.01)
*H02G 3/06* (2006.01)

(52) U.S. Cl.
CPC ............ *H02G 3/0406* (2013.01); *F16L 55/07* (2013.01); *H02G 3/0481* (2013.01); *H02G 3/06* (2013.01)

(58) Field of Classification Search
CPC ..... F16L 55/07; F16L 23/167; F16L 2201/30; H02G 3/0406; H02G 3/0481; H02G 3/06; H02G 3/0475; H02G 1/08
USPC ........................... 285/13, 14, 39, 90; 138/109
See application file for complete search history.

(56) References Cited

U.S. PATENT DOCUMENTS

| | | | | |
|---|---|---|---|---|
| 1,985,012 | A | * | 12/1934 | Boehm ........................... 285/14 |
| 4,171,209 | A | * | 10/1979 | Brown |
| 4,246,926 | A | * | 1/1981 | Morello .................. F16L 55/07 |
| 4,424,989 | A | * | 1/1984 | Spencer .................. F16L 55/07 285/14 X |
| 5,796,035 | A | * | 8/1998 | Walker ................. H02G 3/0406 138/109 |

\* cited by examiner

*Primary Examiner* — Zachary T Dragicevich
(74) *Attorney, Agent, or Firm* — Daniel L. Lundeen; Lundeen & Lundeen PLLC

(57) ABSTRACT

A low point raceway fitting for draining accumulated condensation from electrical raceway systems installed in industrial, commercial and residential facilities. The drain fitting is a tubular member having a throughbore for pulling wire, connecting ends for installation in a raceway system, and an enlarged section between the ends profiled for engagement by a tool for installation. A drain passage is formed radially through the tool engaging member section and is positioned at the underside of the horizontal fitting for gravity drainage. A screen insert can be placed in the drain passage to keep dirt and insects out.

23 Claims, 7 Drawing Sheets

DRAIN NIPPLE

CROSS REFERENCE TO RELATED APPLICATION

This application is a continuation-in-part of my earlier application, U.S. Ser. No. 13/656,547, filed Oct. 19, 2012, now U.S. Pat. No. 9,722,403.

FIELD OF THE INVENTION

The present invention relates generally to electrical raceways, including tubes and conduits, and more particularly to a device to support electrical drain systems for removing condensation from electrical raceway systems at low point areas.

In commercial, offshore, and industrial construction, it is common practice to contain electrical wiring in metal, or sometimes plastic, raceways. As is well known, electrical raceway systems have tubing, conduit and/or fittings that form a clear, protected pathway for electrical wiring. Even in relatively dry locations, condensation typically forms on the interior walls of the raceway due to moisture in the air. In installations where raceways are employed, corrosion and premature deterioration of the raceway material may result. Further, an accumulation of condensate in the raceway system may result in creating an electrical short circuit and damage to electrical devices or ignition of flammable vapors.

The problem of condensate accumulating inside the raceways may be eliminated by providing a drain at various low points in the raceway system. Currently the fittings used are heavy, bulky, expensive, and difficult and labor intensive to install. Additionally, the current fittings used add extra weight to offshore structures and require more space to install. The current installation of fittings known to those skilled in the art would require multiple cutting and threading of multiple raceway sections with an increased risk of improper installation. What is needed is a simple device that can be easily installed within an electrical raceway system that decreases the risk of compromising the integrity of the electrical raceway.

SUMMARY OF THE INVENTION

The present invention provides a low point drain fitting for removing accumulated condensation from electrical raceway systems. The drain fitting includes a tubular member having a throughbore forming a clear raceway extending through a length of the tubular member from a first end to a second end. Internally or externally disposed first and second coupling sections are disposed on the opposing first and second ends. A tool engaging member comprising a three-dimensional external profile on the tubular member is spaced from the first and second ends for cooperative engagement with an installation tool, whereby the drain fitting can be easily installed. A transverse channel formed in an interior surface of the tool engaging member extends upwardly in an arc on opposing sides of a lowermost point of the channel when the tubular member is installed horizontally in a raceway system. A downward passage is perpendicularly aligned with the circular bore and extends linearly downward from the lowermost point through a body of the tool engaging member to an aperture to an exterior of the tool engaging member. There is thus a passageway for condensation to drain by gravity from the raceway, into the channel, through the downward passage, and out the aperture from the tool engaging member. In embodiments a screen insert can be installed in the aperture.

One object of the invention is to provide a drain fitting that is easily installed within the electrical raceway system. Other objects and advantages of the invention will appear from the following description.

BRIEF DESCRIPTION OF THE DRAWINGS

For a detailed description of a preferred embodiment of the invention, reference will now be made to the accompanying drawings wherein.

DETAILED DESCRIPTION

Figure 1:
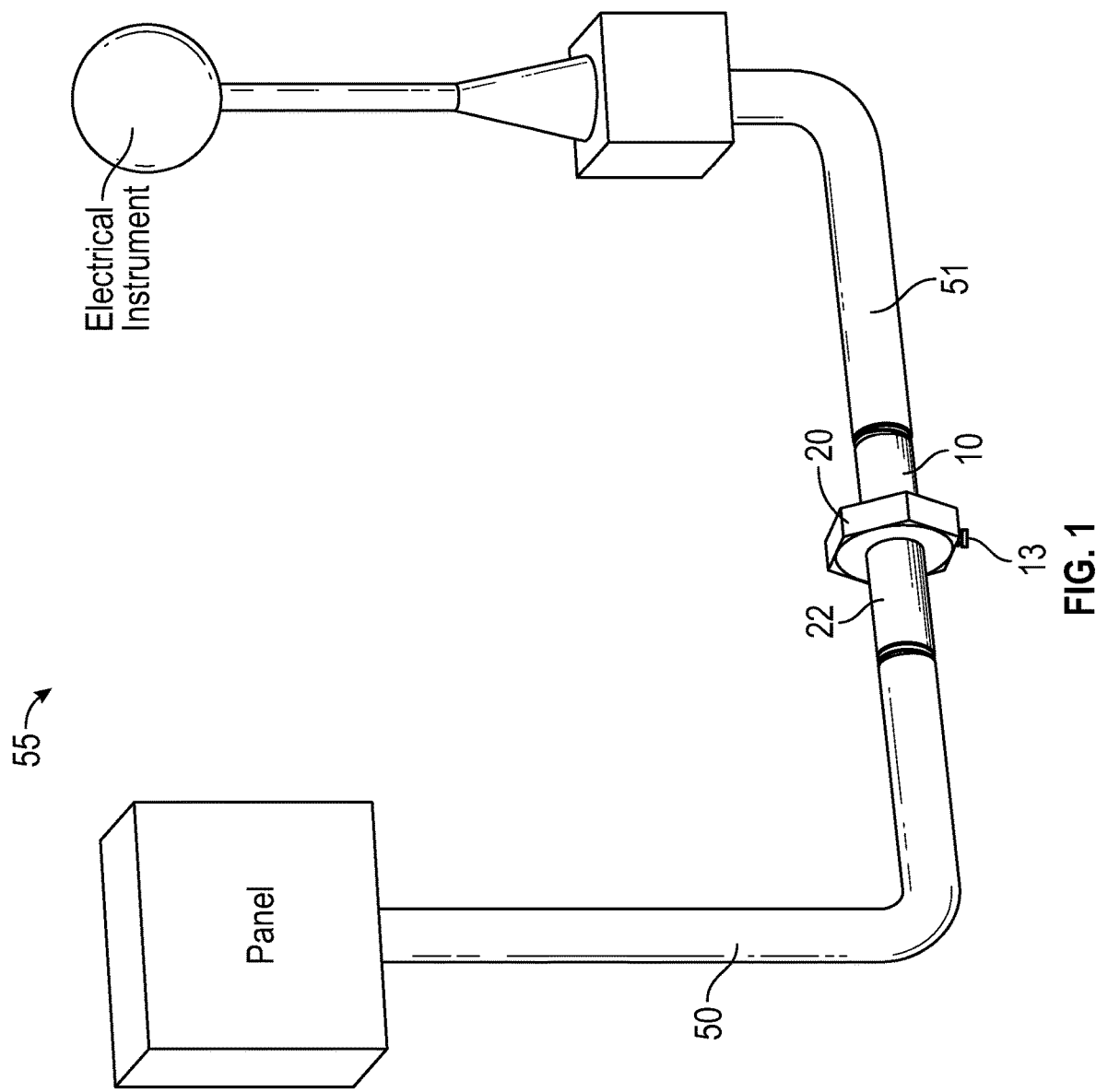
FIG. 1 is a perspective schematic of one embodiment of a drain fitting installed within an electrical raceway system.

With reference to FIG. 1 there is shown a perspective view of an embodiment of the present invention, drain coupling (10) with internal connections installed in an electrical raceway system (55) at a low point to allow gravity drainage of water accumulated as a result of moisture condensation within the electrical raceway system. Drain coupling (10) is situated between interconnected raceway section (50) and raceway section (51) as shown in FIG. 1.

Figure 1A:
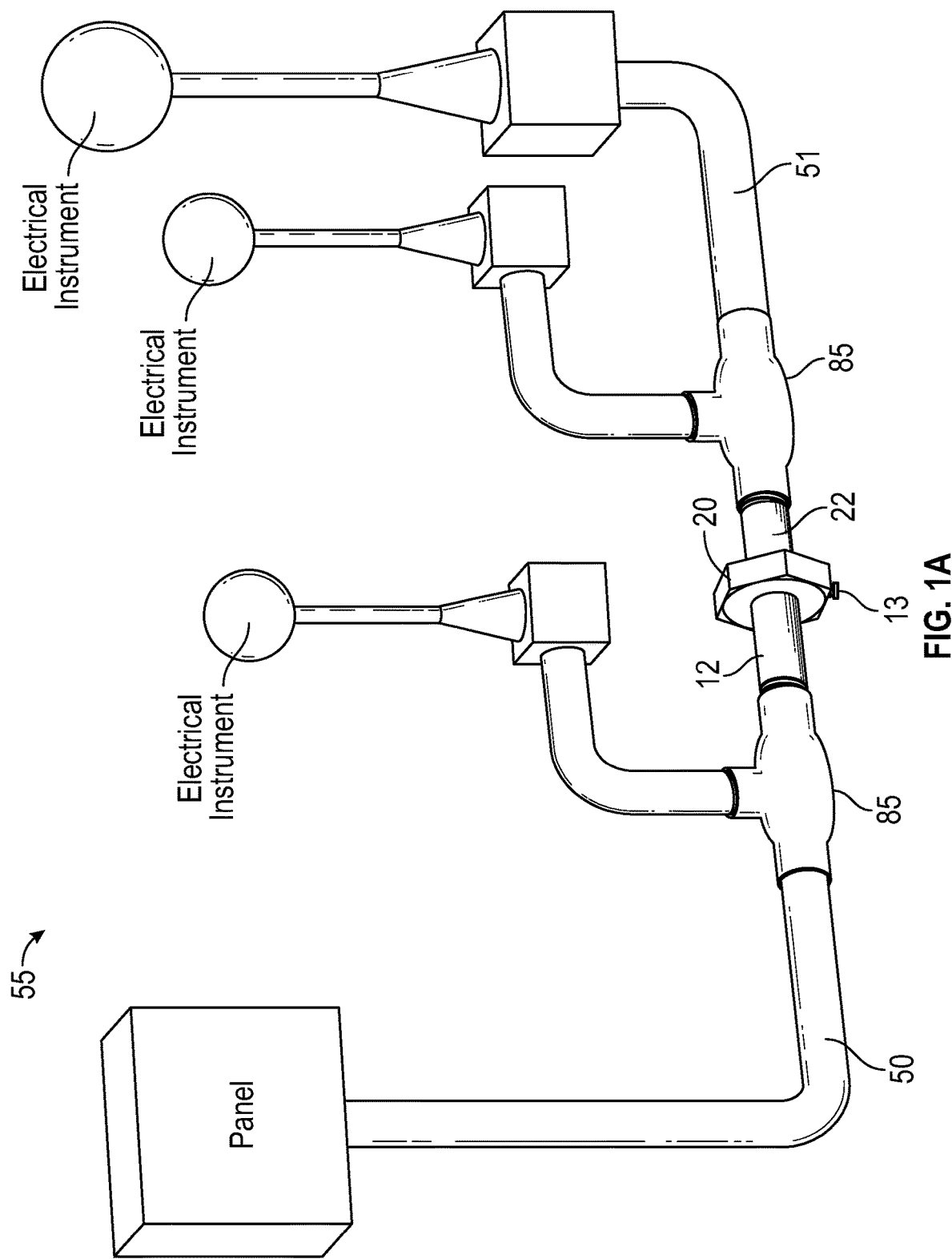
FIG. 1A is a perspective schematic of an alternative embodiment of a drain fitting installed within an electrical raceway system.

Alternatively drain nipple (12) with external threads can be installed between conventional junction tee fittings (85) as shown in FIG. 1A.

Figure 2:
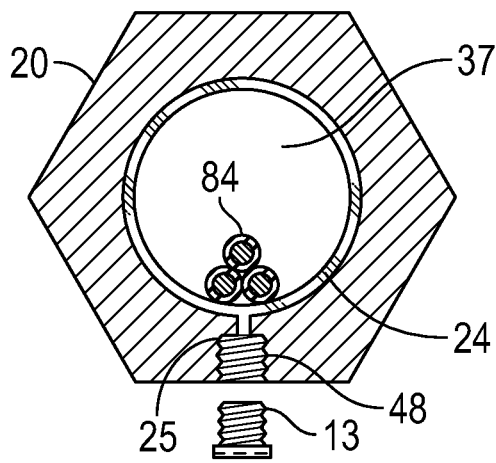
FIG. 2 is a cross-section end view of the fitting through the tool engaging member with an embodiment of a threaded screen insert placed within a drain passage perpendicular to the throughbore.
Figure 2A:
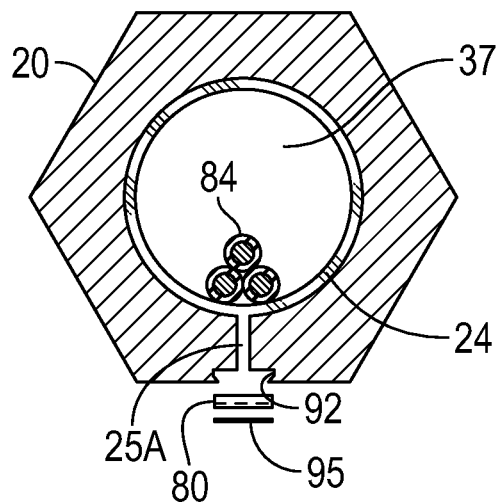
FIG. 2A is a cross-section end view of the fitting through the tool engaging member with an embodiment of a clip-in screen insert placed within the drain passage.
Figure 2B:
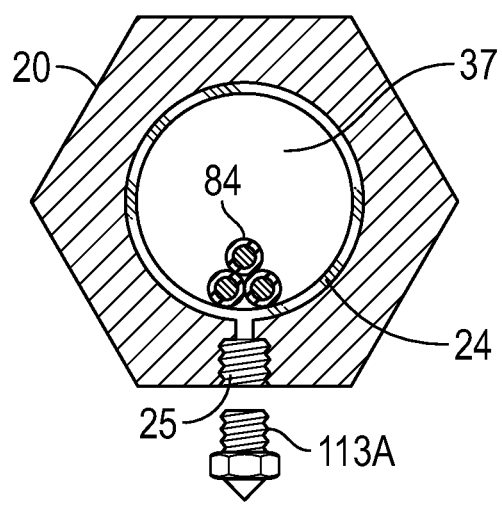
FIG. 2B is a cross-section end view of the fitting through the tool engaging member with an embodiment of a conical screen insert placed within the drain passage.

In use, to install the drain coupling (10) or nipple (12) as shown in FIGS. 1 and 1A, respectively, at the interconnections of raceway sections (50) and (51) and/or tee fittings (85), a tool is used to rotate the fitting (10, 12) using the tool engaging member (20) to thread or otherwise connect the connecting ends (60, 62) (FIGS. 5 and 5A) to adjacent raceway section(s) (50), (51) and/or tee fitting(s) (85). The screen insert (13, 80, 113A) is installed in the drain passage (25, 25A) (FIGS. 2, 2A, 2B). Thus, a technician would not have to cut and thread which is done currently to install the tee (85) and drain insert (15) in the prior art raceway system 83 as shown in FIG. 6. Thus, time is saved during the installation phase. Additionally, by installing the device (10, 12) of the present invention without cutting and threading, factory coatings are preserved on metal raceway surfaces, thereby preventing premature corrosion and eliminating field dressing within the electrical raceway system 55.

The drain coupling (10) or nipple (12) in FIGS. 1 and 1A, respectively, replaces the juncture configuration (83) using raceway tee fitting (85) depicted in the prior art connecting sections (50) and (51) shown in FIG. 6. The device (10, 12) of the present invention decreases the installation time relative to that required to install the standard raceway tee fitting (85) illustrated in FIG. 6, which includes a tee cover (86), gasket (not shown), reducer (87) and screen insert (15). Additionally, the time normally required to pull wire through the tee fitting (85) is significantly decreased by installation of drain coupling (10) or nipple (12), saving time and money in equipment and labor. With the present invention, wire (84) (FIGS. 2, 2A, 2B) is pulled through the fitting (10, 12) in the same manner as conventional raceway conduit, nipples, couplings, etc. Another advantage is that the drain coupling (10) or nipple (12) is a unitary piece that is lighter in weight and requires less space for installation, transport and storage, important considerations on an offshore platform.

With reference to FIGS. 2, 2A, 2B, 3, 4, 5, 5A, 7, and 7A, there are shown various cross sectional and perspective views of alternative embodiments of the present invention. Drain coupling (10) or nipple (12) further comprise a cylindrical tubular member (22) of a pre-determined length with a throughbore (37) having a continuous diameter therethrough and a channel (24) formed inside at the drain passage (25, 25A, 35). Coupling (10) or nipple (12) can be made of galvanized steel, PVC piping, PVC coated steel, stainless steel, brass, or another suitable type of material that will not rust from moisture or corrosive environments.

Figure 5:
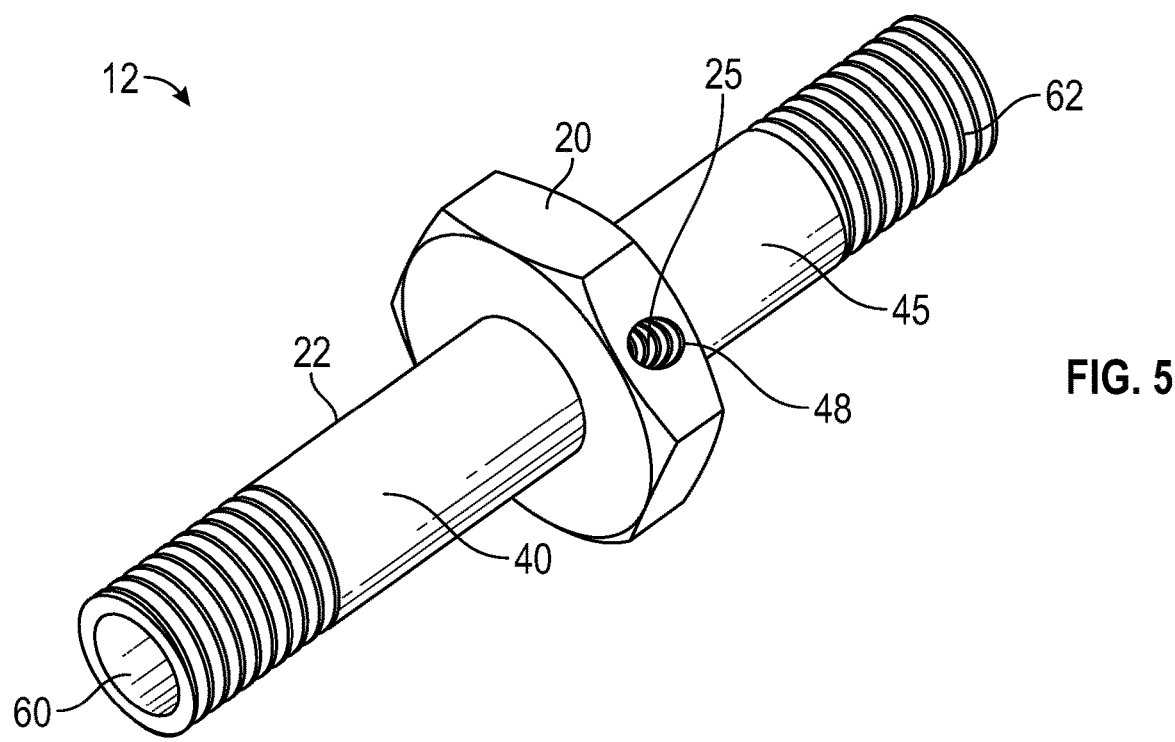
FIG. 5 is a perspective view of the fitting as a nipple with external threads on the tubular member of the present invention.
Figure 5A:
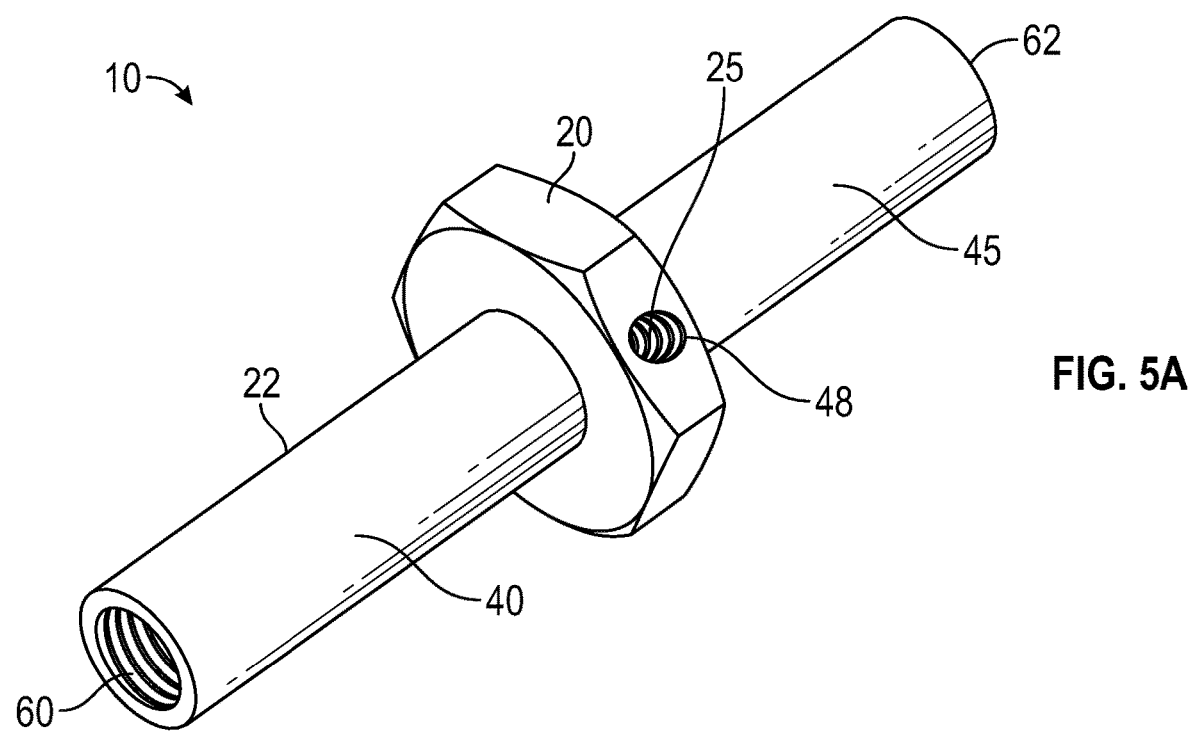
FIG. 5A is a perspective view of the fitting as a coupling with internal threads on the tubular member filter.
Figure 6:
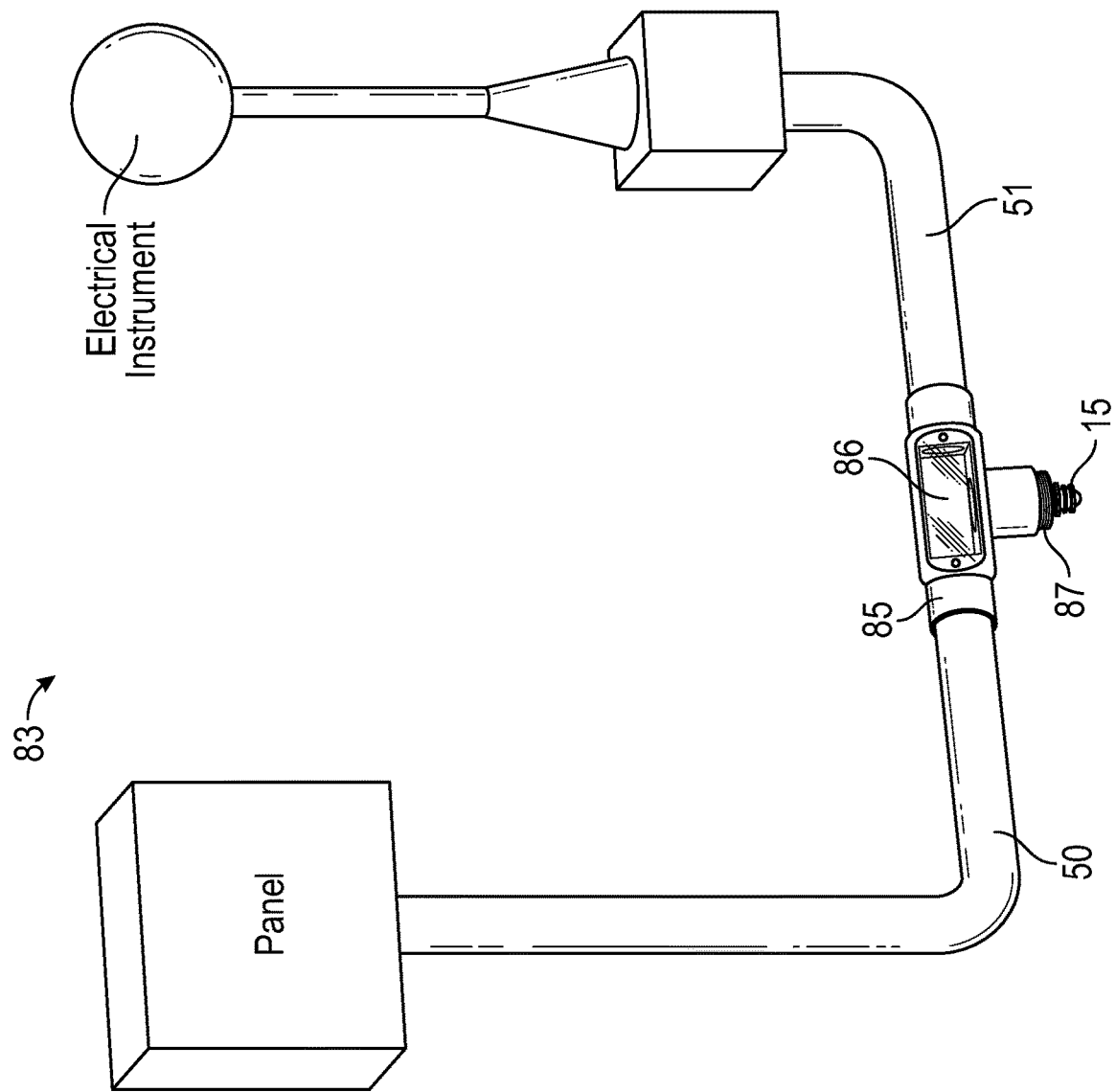
FIG. 6 is a schematic of prior art drain fittings installed within an electrical raceway system.

Referring to FIGS. 5, and 5A, in the preferred embodiment, the tubular member (22) can have a length and diameter configured to accommodate any raceway size. The specific length of the tubular member (22) depends on the diameter of the tubular member (22) as required for the electrical raceway system (55), raceway sections (50, 51) and/or the connecting fittings (85). In the preferred embodiment the diameter of the tubular member (22) can be nominally at least ½ inch. Additionally, the length of the opposing connection members (60, 62) depend on the diameter and the length of tubular member (22). Thus, drain coupling (10) or nipple (12) of the present invention can be configured and manufactured to fit any electrical raceway.

Referring to FIGS. 2, 2A, 2B, 3, 4, 5, 5A the drain coupling (10) or nipple (12) further comprise a unitary tool engaging member (20) which is generally centrally disposed as an enlarged section encircling tubular member (22) and protruding radially outward therefrom. Tool engaging member (20) further comprises a solid three-dimensional surface structure configured to cooperatively engage with a corresponding tool device. In the preferred embodiment, as shown tool engaging member (20) has a hexagonal profile and is configured to cooperatively engage with a wrench having a complementary profile. However, tool engaging member (20) can be configured to support other torque tools that can be used to interconnect electrical raceways.

In the preferred embodiment, the hexagonal tool engaging member (20) can be at least ⅞ inches in depth from an outer diameter of the tubular member (22) and at least 1⅛ inches wide in axial length. However, the depth can be configured in length to support drain passage (25, 25A, 35) as shown in FIGS. 2, 2A, and 2B.

First tubular portion (40) and opposing tubular portion (45) extend from opposing sides of tool engaging member (20) to respective distal ends as seen in FIGS. 5 and 5A. Drain coupling (10) or nipple (12) further comprise a first connection member (60) formed upon first tubular portion (40) and an opposing second connection member (62) formed upon opposing tubular portion (45). Each tubular portion is configured to cooperatively engage with raceways or raceway fittings within an electrical system (55) as depicted in FIGS. 1 and 1A. First connection member (60) and opposing second connection member (62) are shown as threaded and the threads can be internally or externally disposed, preferably female or male NPT or metric threads. In the preferred embodiment connection members (60, 62) can have a threaded length configured to accommodate the electrical raceway section or fitting of the system.

Referring to FIGS. 2, 2A, 2B, 3, 4, 5, 5A, 7, and 7A, drain coupling (10) or nipple (12) further comprise a drain passage (25, 25A) disposed within one section of the tool engaging member (20), perpendicularly aligned with throughbore (37) (FIGS. 2, 2A, 2B) and having a continuous diameter linearly extending therefrom.

In one embodiment as shown in FIG. 2A, drain passage (25A) can be a smooth bore extending downward. In this embodiment drain passage (25A) has a diameter that can be at least $1/16^{th}$ of an inch. In the alternative embodiment in FIGS. 2 and 2B, drain passage (25) has threads (48). In this embodiment the drain passage (25) is slightly larger at the external end and can have a diameter at least ½ inch to allow for connection to a threaded screen insert (13) which allows for drainage of condensation from the electrical raceway. As depicted drain passages (25, 25A) are perpendicularly aligned with throughbore (37) and extend linearly downward therefrom.

In the preferred embodiment, the connection members (60, 62) have conventional NPT or metric threading as depicted in FIGS. 5, 5A. However, connection members (60, 62) can be configured to support any electrical raceways or raceway fittings. Drain passage (25, 25A) can have a small diameter of 1/16th inch and/or a larger diameter of ½ inch as depicted in FIGS. 2, 2A and 2B.

Figure 3:
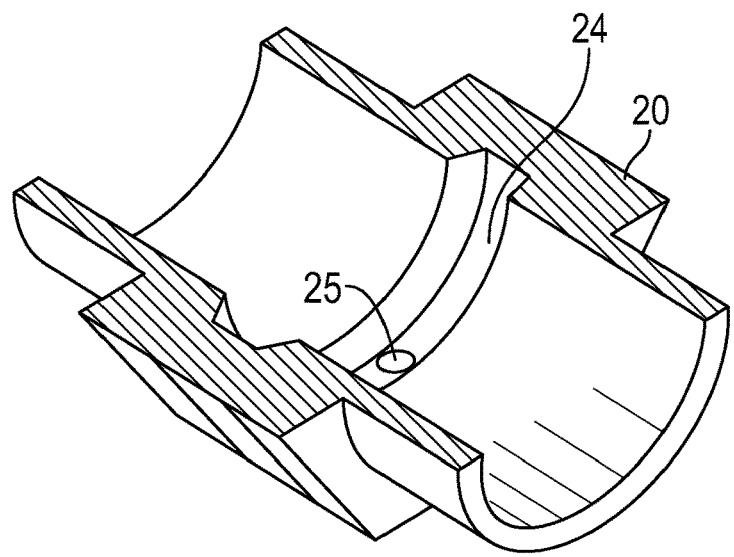
FIG. 3 is a cutaway, perspective view of a horizontal section of the fitting of the present invention.
Figure 4:
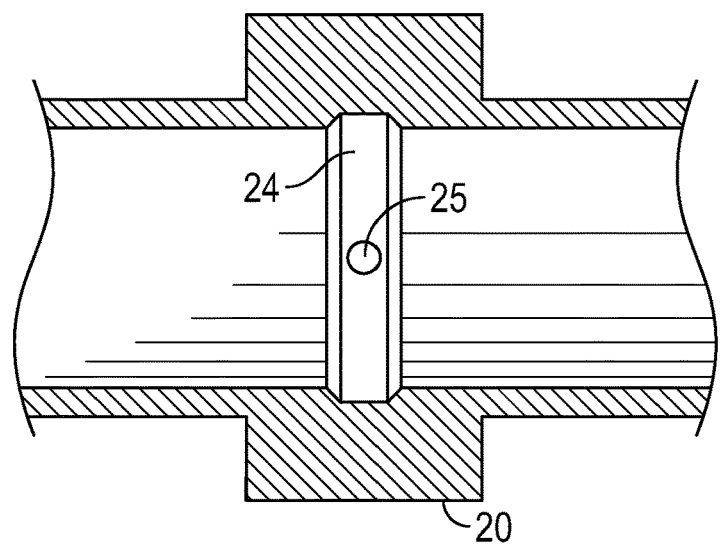
FIG. 4 is a plan view of the horizontal section of the fitting of FIG. 3.

As shown in perspective sectional view in FIG. 3 and plan sectional view in FIG. 4, drain passage (35) is a smooth bore and extends through tool engaging member (20) and into the throughbore (37) of tubular member (20) at the cavity or groove (24). As shown in FIGS. 5 and 5A, drain passage (25A) linearly extends from the throughbore (37) (see FIG. 2A) and has a larger-diameter threaded section (48) to facilitate drainage by cooperatively engaging with screen insert (13) or another fitting (see FIGS. 2A, 2B). Threads (48) can be conventional NPT threading.

Referring to FIG. 2A there is shown a screen insert (80) located at the end of the drain passage (25A). Screen (80) can be made of plastic, stainless steel, aluminum, or another non-corrosive material. The outer end of the drain passage (25A) is enlarged and has a radial channel (92) that receives the screen insert (80) therein. A fastener such as a spring-loaded clip mechanism (95) can be disposed within channel (92) to allow the screen insert (80) to be securely fastened therein.

While in use drain coupling (10) or nipple (12) is placed within the lowest gravity point within the electrical raceway system with the drain passage (25, 25A) located facing downward which allows condensate or oil to drain down and out.

Figure 7:
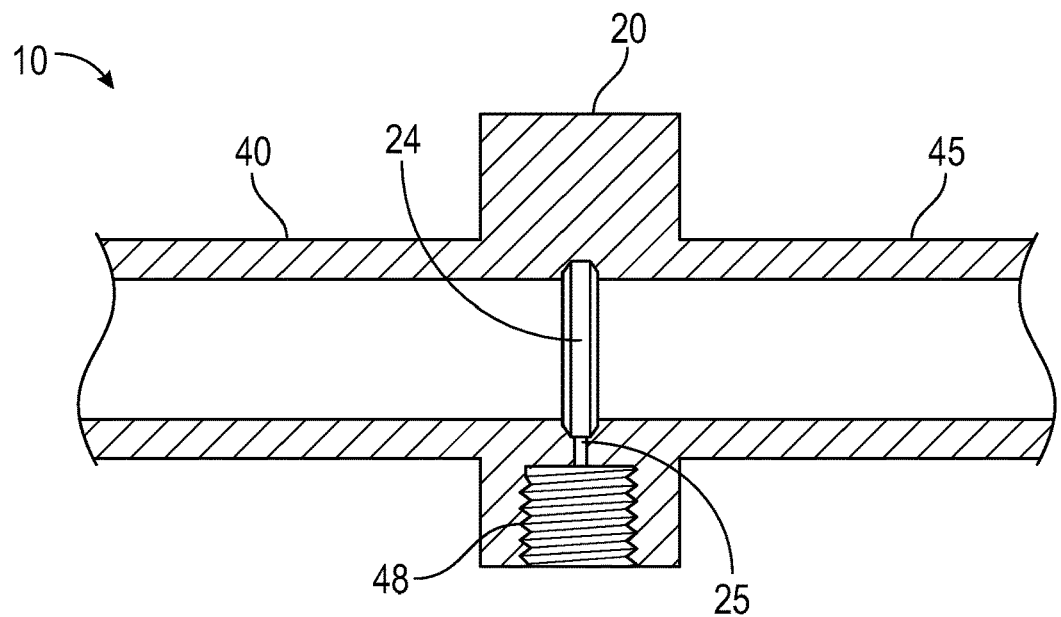
FIG. 7 is a cross-section side view of one embodiment of the present invention with a tapered diameter into the channel.
Figure 7A:
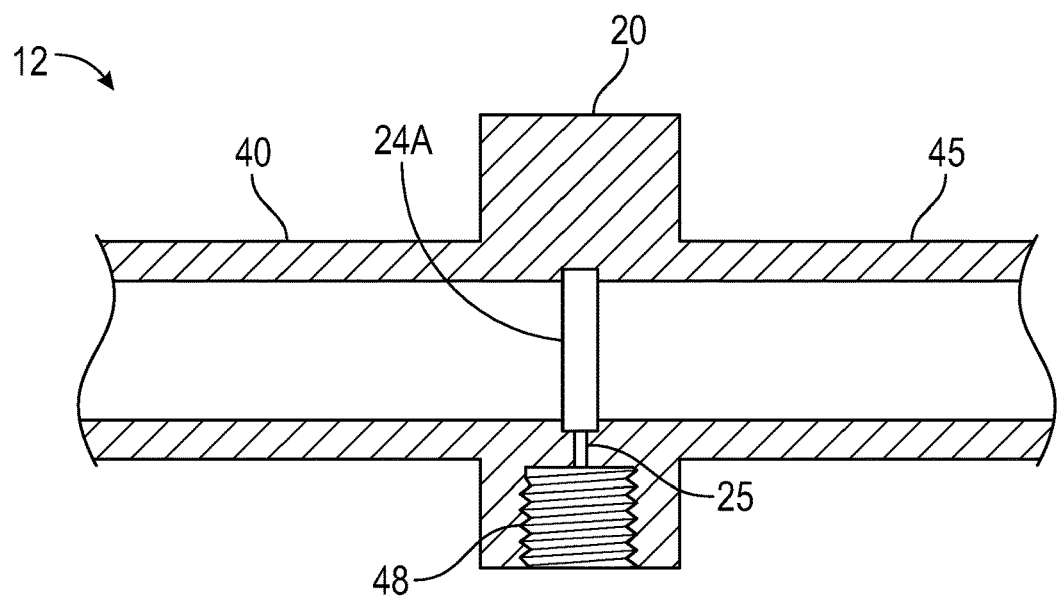
FIG. 7A is a cross-section side view of an alternative embodiment of the fitting of the present invention with sides of the channel at a right angle with respect to the bore.

Referring to FIGS. 2, 2A, 2B, 3, 4, 7, and 7A, the present invention includes a transverse channel (24, 24A) is formed in an interior surface of the tool engaging member (20) and extends upwardly in an arc on opposing sides of a lowermost point of the channel (24, 24A) when the fitting (10, 12) is disposed horizontally. As shown in FIG. 7 the channel (24) has sides tapering at oblique angles to the surface of the throughbore (37). Alternatively, as shown in FIG. 7A, the channel (24A) has walls that form 90 degree right angles on opposing sides. The channel (24, 24A) allows condensation to drain by gravity from the raceway (37)

While the preferred embodiments of the invention have been shown and described, modifications thereof can be made by one skilled in the art without departing from the spirit and teachings of the invention. The embodiments described herein are exemplary only and are not limiting. Many variations and modification of the invention and apparatus disclosed herein are possible and are within the scope of the invention. Accordingly, the scope of protection is not limited by the description set out above, but is only limited by the claims which follow, the scope including all equivalents of the subject matter of the claims.

The invention claimed is:

1. A drain device for an electrical raceway system comprising:
    a tubular member having a cylindrical bore with a continuous diameter to form a clear raceway extending through a length of the tubular member from a first end to a second end;
    a first coupling section disposed on the first end;
    a second coupling section disposed on the second end;
    a tool engaging member comprising a three-dimensional external profile on the tubular member spaced from the first and second ends for cooperative engagement with an installation tool;
    a transverse channel formed in an interior surface of the tool engaging member and extending upwardly in an arc on opposing sides of a lowermost point of the channel when the tubular member is disposed horizontally;
    a downward passageway perpendicularly aligned with respect to the cylindrical bore and extending linearly downward from the lowermost point through a body of the tool engaging member to an aperture to an exterior of the tool engaging member for condensation to drain by gravity from the raceway, into the channel, through the downward passage, and out the aperture from the tool engaging member; and
    a screen insert disposed in the aperture.

2. The device of claim 1 wherein the first and second coupling sections have female connections.

3. The device of claim 1 wherein the first and second coupling sections have male connections.

4. The device of claim 1 wherein the external profile of the tool engaging member is hexagonal for engaging with a wrench.

5. The device of claim 1 wherein the external profile of the tool engaging member is configured to engage with a torque tool.

6. The device of claim 1 wherein the tool engaging member is centrally disposed upon the tubular member.

7. The device of claim 1 wherein the passage has a smooth internal surface from the channel to the aperture.

8. The device of claim 1 wherein the downward passage has a diameter of at least 1/16 inch.

9. The device of claim 1 wherein the aperture has a diameter of at least 1/2 inch.

10. The device of claim 1 wherein the channel has sides at an oblique angle with respect to the bore.

11. The device of claim 1 further comprising tapering from the diameter of the bore to the channel.

12. The device of claim 1 wherein the channel has sides at a right angle with respect to the bore.

13. An electrical raceway system comprising:
    a drain device comprising a horizontally disposed tubular member having first and second ends;
    a tool engaging member comprising a three-dimensional external profile on the tubular member spaced from the first and second ends for cooperative engagement with an installation tool;
    a first coupling section disposed on the first end of the tubular member coupling the drain device to a first raceway conduit or fitting;
    a second coupling section disposed on the second end of the tubular member coupling the drain device to a second raceway conduit or fitting;
    a cylindrical bore with a generally continuous diameter through a length of the tubular member from the first end to the second end;
    a clear raceway extending from the first raceway conduit or fitting, through the cylindrical bore of the drain device, to the second raceway conduit or fitting;
    a transverse channel formed in an interior of the tool engaging member of the drain device and extending upwardly in an arc on opposing sides of a lowermost point of the channel;
    a downward passageway perpendicularly aligned with the bore and extending linearly downward from the lowermost point through a body of the tool engaging member to an aperture to an exterior of the tool engaging member of the drain device, for condensation to drain by gravity from the raceway, into the channel, through the downward passageway, and out the aperture from the tool engaging member of the drain device.

14. The raceway system of claim 13 wherein the channel has sides at an oblique angle with respect to the bore, and further comprising tapering from the diameter of the bore to an outside diameter of the channel.

15. The raceway system of claim 14, further comprising a screen insert disposed in the aperture.

16. The raceway system of claim 13, further comprising a screen insert disposed in the aperture.

17. The raceway system of claim 13 wherein the channel has sides at a right angle with respect to the bore.

18. A method to drain an electrical raceway system comprising:
    cooperatively engaging, with an installation tool, a tool engaging member comprising a three-dimensional external profile on a tubular member of a drain device, wherein the tool engaging member is spaced from first and second ends of the tubular member;
    coupling a first coupling section disposed on the first end of the tubular member of the drain device to a first raceway conduit or fitting;
    coupling a second coupling section disposed on the second end of the tubular member of the drain device to a second raceway conduit or fitting;
    forming a clear raceway extending from the first raceway conduit or fitting, through a cylindrical bore of the drain device having a generally continuous diameter through a length of the tubular member from the first end to the second end, to the second raceway conduit or fitting;

orienting the tubular member horizontally to define a lowermost point of a transverse channel formed in an interior of the tool engaging member of the drain device, the channel extending upwardly in an arc on opposing sides of the lowermost point;

perpendicularly aligning, with respect to the bore, a downward passageway through a body of the tool engaging member and extending linearly downward from the lowermost point to an aperture to an exterior of the tool engaging member of the drain device; and gravity draining condensation from the raceway, through the passageway into the channel, and out the aperture from the tool engaging member of the drain device.

19. The method of claim 18 wherein the channel has sides at an oblique angle with respect to the bore and tapering from the diameter of the bore to the channel, and further comprising pulling wire through the raceway through the drain device.

20. The method of claim 19, further comprising a screen insert disposed in the aperture.

21. The method of claim 19 wherein the channel has sides at a right angle with respect to the bore.

22. The method of claim 18, further comprising a screen insert disposed in the aperture.

23. A drain device for an electrical raceway system comprising:

a tubular member having a cylindrical bore with a continuous diameter to form a clear raceway extending through a length of the tubular member from a first end to a second end;

a first coupling section disposed on the first end;

a second coupling section disposed on the second end;

a tool engaging member comprising a three-dimensional external profile on the tubular member spaced from the first and second ends for cooperative engagement with an installation tool;

a transverse channel formed in an interior surface of the tool engaging member and extending upwardly in an arc on opposing sides of a lowermost point of the channel when the tubular member is disposed horizontally;

a downward passageway perpendicularly aligned with respect to the cylindrical bore and extending linearly downward from the lowermost point through a body of the tool engaging member to an aperture to an exterior of the tool engaging member for condensation to drain by gravity from the raceway, into the channel, through the downward passage, and out the aperture from the tool engaging member; and wherein the channel has sides at an oblique angle with respect to the bore.

* * * * *